United States Patent [19]

Nagel et al.

[11] Patent Number: 6,096,109
[45] Date of Patent: Aug. 1, 2000

[54] CHEMICAL COMPONENT RECOVERY FROM LIGATED-METALS

[75] Inventors: Christopher J. Nagel, Wayland, Mass.; Robert D. Bach, Grosse Pointe, Mich.

[73] Assignee: Molten Metal Technology, Inc., Waltham, Mass.

[21] Appl. No.: 08/588,603

[22] Filed: Jan. 18, 1996

[51] Int. Cl.[7] .................................................. C21B 11/10
[52] U.S. Cl. .................. 75/10.1; 75/10.13; 75/10.15; 75/10.18; 75/10.2; 75/10.21; 75/10.22; 423/249
[58] Field of Search ..................... 423/249, 257, 423/258, 490, 499.1; 204/157.4, 157.41, 157.44; 75/10.13, 10.15, 10.18, 10.2, 10.21, 10.22, 10.1

[56] References Cited

U.S. PATENT DOCUMENTS

| | | | |
|---|---|---|---|
| 3,533,777 | 10/1970 | McTaggart et al. | 75/10 |
| 3,658,673 | 4/1972 | Kugler et al. | 204/164 |
| 3,708,409 | 1/1973 | Bainbridge | 204/164 |
| 3,901,778 | 8/1975 | Machi et al. | 201/157.1 |
| 3,938,988 | 2/1976 | Othmer | 75/10 R |
| 3,977,952 | 8/1976 | Knoevenagel et al. | 204/157.1 R |
| 4,144,152 | 3/1979 | Kitchens | 204/158 R |
| 4,330,382 | 5/1982 | Yardley et al. | 204/157.1 R |
| 4,345,983 | 8/1982 | Wan | 204/158 R |
| 4,431,612 | 2/1984 | Bell et al. | 422/186.21 |
| 4,438,706 | 3/1984 | Bóday et al. | 110/238 |
| 4,479,443 | 10/1984 | Faldt et al. | 110/346 |
| 4,509,434 | 4/1985 | Bóday et al. | 110/238 |
| 4,519,835 | 5/1985 | Gauvin et al. | 75/10 R |
| 4,561,883 | 12/1985 | Müllner et al. | 75/10 R |
| 4,582,004 | 4/1986 | Fey et al. | 110/346 |
| 4,615,285 | 10/1986 | Bentell et al. | 110/346 |
| 4,644,877 | 2/1987 | Barton et al. | 110/250 |
| 4,695,448 | 9/1987 | Anthony | 423/659 |
| 4,734,177 | 3/1988 | Robinson et al. | 204/157.2 |
| 4,940,519 | 7/1990 | Dames | 204/130 |
| 5,185,104 | 2/1993 | Horie | 252/632 |
| 5,207,999 | 5/1993 | Burk et al. | 423/258 |
| 5,322,547 | 6/1994 | Nagel et al. | 75/414 |
| 5,324,485 | 6/1994 | White | 422/159 |
| 5,396,850 | 3/1995 | Conochie et al. | 110/346 |

FOREIGN PATENT DOCUMENTS

| | | |
|---|---|---|
| WO 95/32921 | 12/1995 | WIPO . |
| WO 95/33689 | 12/1995 | WIPO . |

OTHER PUBLICATIONS

Atamanov et al, "Reduction of metals in a steady beam–plasma discharge," *Sov. Phys. Tech. Phys.*, 49(11):1287–1292, (Nov. 1979).

*Primary Examiner*—Ngoclan Mai
*Attorney, Agent, or Firm*—Hamilton, Brook, Smith & Reynolds, P.C.

[57] ABSTRACT

A method for converting a ligated-metal into chemical components of the ligated-metal includes forming an ionized zone that can convert the ligated-metal to a reduced ligated-metal intermediate. The ligated-metal is directed into the ionized zone, whereby the ligated-metal is converted to a reduced ligated-metal intermediate, thereby causing a thermodynamically stable metal-ligand bond of the ligated-metal to be electronically destabilized and inducing subsequent metal-ligand bond rupture. The reduced ligated-metal intermediate is converted by the metal-ligand bond rupture into chemical components of the ligated-metal. Ligated-metals that are suitable for processing by the method of the invention include, for example: uranium hexafluoride ($UF_6$); sodium chloride (NaCl); and metal halides, such as iron trichloride ($FeCl_3$). Chemical components that can be recovered from the ligated-metal include, for example, metals and gases derived from the ligand component of the ligated-metals.

54 Claims, 1 Drawing Sheet

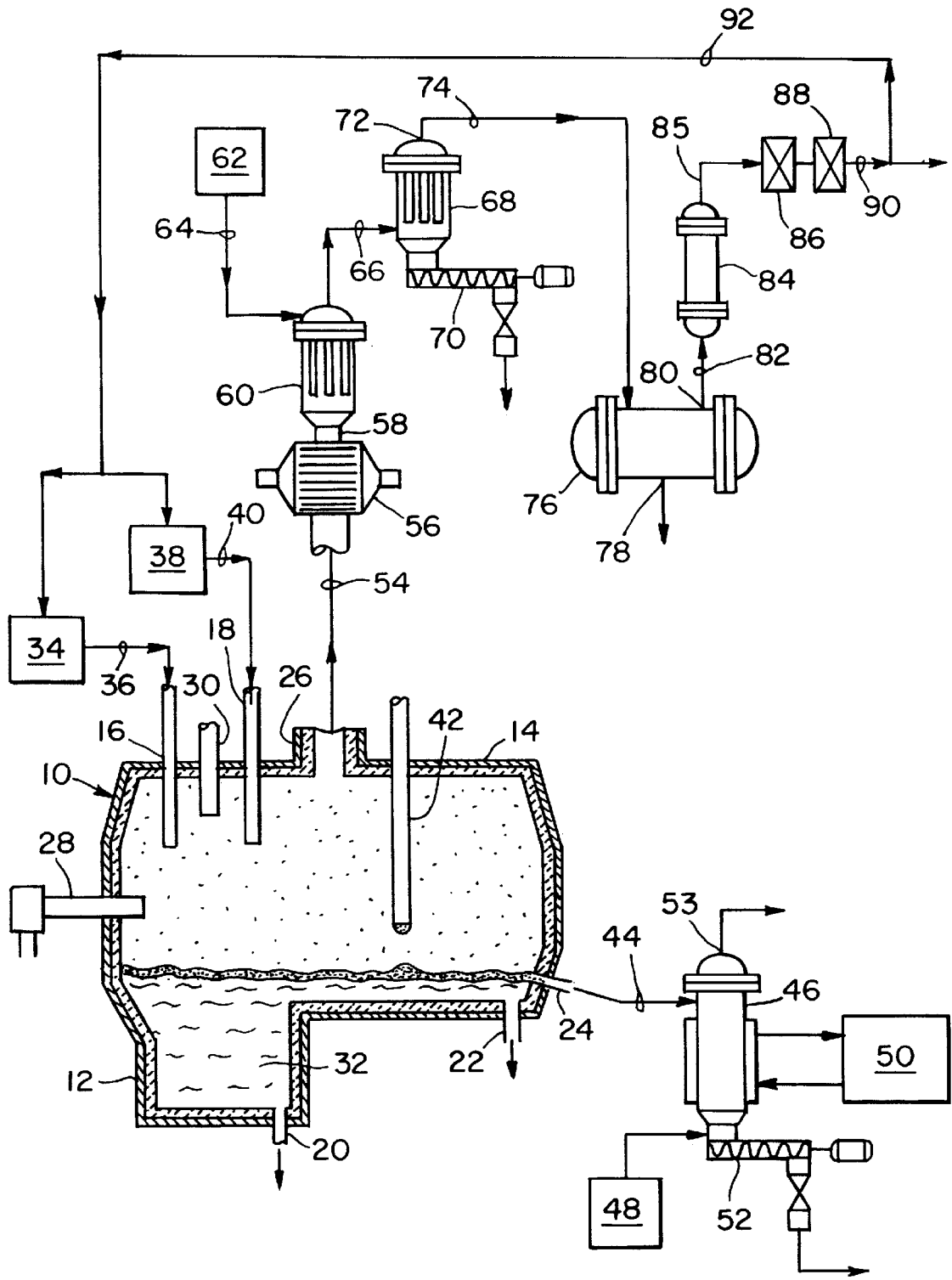

CHEMICAL COMPONENT RECOVERY FROM LIGATED-METALS

BACKGROUND OF THE INVENTION

Many industrial product and byproduct streams include metal-containing compounds. Common metal compounds produced by industrial processes are ligated-metal compounds, such as metal halides, metal cyanides, etc. For example, refinement of titaniferous ores results in an annual production of several million tons of iron chlorides as byproduct.

Historically, many such by-products, including by-product ligated-metal compounds, are classified as industrial wastes and have been disposed of in land fills or by deep-well injection. However, disposal of industrial wastes by these methods has become an increasingly difficult problem because of diminishing availability of disposal space, strengthened governmental regulations, and a growing public awareness of the impact of hazardous and non-hazardous wastes on the environment. Release of industrial wastes, particularly ligated-metal compounds, to the environment can contaminate air and water supplies, thereby diminishing the quality of life in affected populations. Furthermore, discharge to the environment of some hazardous wastes, such as byproduct ligated-metal compounds, constitutes a loss of potentially valuable chemical components of the wastes.

Therefore, a need exists to produce metal-containing compounds more efficiently and to overcome or minimize the above-mentioned problems associated with hazardous byproducts that include ligated-metal components.

SUMMARY OF THE INVENTION

The present invention relates to a method for converting a ligated-metal into chemical components of the ligated-metal.

The method includes forming an ionized zone that can convert a ligated-metal to a reduced ligated-metal intermediate. The ligated-metal is directed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, the reduced ligated-metal intermediate being converted by the metal-ligand bond rupture into chemical components of the ligated-metal.

Advantages of this invention include, for example, an ability to produce elemental metals from ligated-metals. Further, other commercially significant materials can be generated by the method of the invention, such as gases formed from ligand components recovered from ligated-metals. Examples of such gases include hydrochloric acid, chlorine gas, hydrofluoric acid, fluorine, fluorine gas, etc. In addition, electronic destabilization of thermodynamically stable metal-ligand bonds of the ligated-metals can be controlled to isolate reduced ligated-metal intermediates. For example, iron trichloride ($FeCl_3$) can be dissociated to iron dichloride ($FeCl_2$). Iron monochloride ($FeCl$) can also be produced prior to complete dissociation to elemental iron ($Fe$) and chlorine gas ($C_2$). The reduced ligated-metal intermediates can be separated and recovered independently. Also, chlorine recovered from byproducts can be recycled to produce titanium tetrachloride ($TiCl_4$). In other commercial processes, such as production of aluminum chloride, product purification can produce contaminated products that can be converted back to starting materials that are recycled to thereby lower overall production costs.

BRIEF DESCRIPTION OF THE DRAWING

The FIGURE is a cut-away side elevational illustration of an apparatus suitable for electronically destablizing a thermodynamically stable metal-ligand bond of a ligated-metal by the method of the invention.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the present invention.

The invention generally relates to a method for converting a ligated-metal into chemical components of the ligated-metal by forming an ionized zone that can electronically destabilize a thermodynamically stable metal-ligand bond of the ligated-metal. The ligated-metal is directed into the ionized zone, whereby the thermodynamically stable metal-ligand bond of the ligated-metal is electronically destabilized as a consequence of the formation of a reduced ligated-metal intermediate, thereby inducing subsequent metal-ligand bond rupture and converting the reduced ligated-metal intermediate into chemical components of the ligated-metal.

One embodiment of apparatus that is suitable for conducting the method of the invention is represented in the FIGURE. Referring to the FIGURE, an ionized zone is formed within reactor 10. Reactor 10 includes vertical section 12 and horizontal section 14 extending from vertical section 12. Vertical section 12 is suitable for accumulating a chemical component formed by the method of the invention. Gas inlet 16 and ligated-metal inlet 18 are located at an upper portion of reactor 10. Outlet 20 at vertical section 12 and outlets 22,24 at horizontal section 14 are suitable for discharging accumulated molten chemical components from reactor 10. Outlets 22,24 at horizontal section 14 can be located proximate to each other for separation, along a path of flow of molten components from vertical section 12 through horizontal section 14 to outlets 22,24, and discharge of a molten metal material through outlet 22 and of a ceramic material through outlet 24. Gas outlet 26 is located at an upper portion of reactor 10. An example of a suitable reactor is taught in U.S. Pat. No. 5,301,620, by Nagel, et al., issued Apr. 12, 1994, the teachings of which are incorporated herein by reference in their entirety.

An ionizing means at reactor 10 is suitable for ionizing a gas directed into reactor 10 through gas inlet 16. The ionizing means includes electrodes 28, 30. Alternatively, suitable ionizing means can include a laser at reactor 10, or some other source of a suitable form of electromagnetic radiation, such as heat or a magnetic field.

It is to be understood that, in other embodiments, an ionized zone can be formed within reactor 10 by other means for providing a source of electrons within reactor 10. For example, a suitable source of electrons can be formed by combining dissimilar metals within reactor 10. Alternatively, a surface within reactor 10 can be formed that provides a source of electrons or that causes a gas directed into reactor 10 to become ionized, etc. In a specific example, an ionized zone can be formed by directing a laser at an inside surface of a reactor that is coated with a metal that is common to a metal component of the ligated-metal to be introduced to the reactor.

When the method of the invention is initiated, reactor 10 can contain a molten bath 32. Molten bath 32 can be a molten metal, a molten salt, or a combination thereof. The molten metal can be a combination of immiscible metals. Typically, molten bath 32 will be comprised of at least one chemical component that is common to a chemical component of a ligated-metal directed into reactor 10. Alternatively, reactor 10 does not include molten bath 32 when the method of the invention is initiated. In this embodiment, molten bath 32 can accumulate within reactor 10 during precipitation of a chemical component of a ligated-metal directed into reactor 10.

The ionizing means is activated and a suitable gas is directed from gas source 34 through line 36 and into reactor 10 through gas inlet 16. Suitable gases include those which, when ionized in reactor 10, provide a source of electrons or ions that can electronically destabilize a thermodynamically stable metal ligand bond of a ligated-metal directed into reactor 10. Typically, electronic destabilization of a stable metal-ligand bond can be achieved by transfer of an electron to the ligated-metal to form a radical anion, or "reduced ligated-metal intermediate":

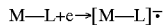

where "M" is a metal and "L" is a ligand, so that "M–L" represents a metal bonded to a ligand, and "[M–L]⁻" represents a radical anion, or reduced ligated-metal intermediate.

In one embodiment, the gas has an ionization potential that is about the same as that of the ligated-metal. For example, the difference between the ionization potential of the gas and the ionization potential of the ligated-metal can be less than about two electron volts. In another embodiment, the gas can have an ionization potential of greater than about ten electron volts. Typically, the gas, when ionized, forms an ionized zone, such as an ionized plasma, that can reduce a metal of the ligated-metal directed into reactor 10. Specific examples of suitable gases to be ionized include hydrogen gas, argon, nitrogen gas, a halogen gas such as chlorine or fluorine gas, a suitable metal, etc., as well as gasifiable feeds. Suitable metals include metals having relatively low ionization potentials, such as Group I metals, including potassium, for example. In one embodiment, potassium can be employed to form an ionized zone by the following pathway:

Gas directed into reactor 10 is ionized by the ionizing means to thereby form an ionized zone within reactor 10. Optionally, the ionized zone is formed by ionizing a gas that includes an element that is common to an element of the ligated-metal. Alternatively, the ionized zone is formed by exposing the ligated-metal to sufficient electromagnetic radiation to electronically destabilize a thermodynamically stable metal-ligand bond of the ligated-metal. Examples of suitable forms of electromagnetic radiation include plasma laser light, heat, a magnetic field, an induction field, etc.

Gas is directed into reactor 10 under conditions that, during activation of the ionizing means, causes the gas to ionize and thereby form and maintain an ionized zone within reactor 10. In one embodiment, conditions suitable for forming and maintaining an ionized zone within reactor 10 include a temperature in a range of up to about 10,000° C., and a pressure that is about atmospheric or greater. In one embodiment, molten bath 10 can be employed in reactor 10 to maintain a substantially constant temperature in the ionized zone within reactor 10.

A ligated-metal is directed from ligated-metal source 38 through line 40 and into reactor 10 at ligated-metal inlet 18 of reactor 10. The ligated-metal can be in the form of a gas at the temperature and pressure of the ionized zone within reactor 10. Alternatively, the ligated-metal can be in the form of a solid and/or liquid dispersion upon entry into reactor 10. Also, generally, the rate at which the ligated-metal is directed into reactor 10, relative to the rate at which the ionized gas is directed into reactor 10, causes the molar ratio of the initially-formed reduced ligated-metal intermediate to the dissociated product chemical components to be less than unity.

The ligated-metal compound can be a component of a stream that is directed into reactor 10 from ligated-metal source 38. An example of a suitable ligated-metal that can be processed by the method of the invention is a metal halide, such as iron chlorides. An example of the suitable source of iron trichloride is waste generated by refinement of titaniferous ores, such as a refining process that includes reaction of titanium tetrachloride ($TiCl_4$) with iron oxide. ($Fe_2O_3$) to form titanium oxide ($TiO_2$), ferrous chloride ($FeCl_2$) and ferric chloride ($FeCl_3$). Alternatively, the ligated-metal can contain an isotopically enriched component or be a component of a radioactive waste stream. In another embodiment of this invention, metals and other heavy chemicals can be derived directly from virgin raw materials or naturally occurring ores. Examples of metal components of ligated-metals directed into reactor 10 include actinides, transition metals, metals selected from Group I and Group II of the Periodic Table of Elements, etc.

Specific examples of metal components of the ligated-metal include iron, nickel, sodium, etc. Examples of ligand components of the ligated-metal include halides, such as chlorine and fluorine, and pseudo-halogens selected from the group consisting of —CN, —OCN, —SCN, —SeCN, —$N_3$, etc. Such ligands are typically either polarizable or electronegative and tend to stabilize the ligated-metal upon its acquiring an electron from the electron source. Other examples of ligand components of the ligated-metals include oxyhalides, nitrides, oxides, sulfides, etc. Specific examples of suitable ligated-metals for processing by the method of the invention include Group I metal halides, Group II metal halides, actinide metal halides, metal oxides, metal sulfides, iron chlorides, nickel chlorides, iron oxides, copper sulfides, sodium chlorides, etc. An example of an actinide metal component of the ligated-metal includes uranium.

Direction of the ligated-metal into the ionized zone within reactor 10 causes a chemical component of the ligated-metal to dissociate from the ligated-metal by electronically destabilizing a thermodynamically stable metal-ligand bond of the ligated-metal upon formation of a reduced ligated-metal intermediate, thereby inducing subsequent metal-ligand bond rupture, the ligated-metal being converted by the metal-ligand bond rupture into chemical components of the ligated-metal. For example, the chemical component can be a metal component of the ligated-metal that is reduced by an ionized gas component in the ionized zone. Reduction of the metal of the ligated-metal waste can cause the metal to precipitate as an elemental metal that accumulates in molten bath 32. In one specific embodiment, the iron component of iron trichloride can be reduced to form elemental iron that precipitates and accumulates to form a molten iron bath within reactor 10.

The bond dissociation energy of metal halides can also be influenced by the oxidation state of the metal. For example, FeCl$_3$ begins to dissociate thermally into FeCl$_2$ and a chlorine atom (Cl) at its melting point (mp=577° K.). On the other hand, FeCl$_2$ has a high thermal stability and can be distilled at its normal boiling point of 1297° K. while FeCl is unstable towards disproportionation and exists only in a dilute gas phase. Thermal decomposition of FeCl$_2$ to its elements is very difficult, even at very high temperatures well in excess of its boiling point. It is believed that the method of the invention lowers the bond dissociation energy of ligated-metals by the electronic destabilization of what is typically otherwise a thermodynamically stable metal-ligand bond.

In one embodiment, the invention is a method for recovering elements from ligated-metals in the gas phase. To avoid the problems of salt formation, an ionized gas is employed as the electron source for electron transfer to the ligated-metal. The ionized gas consists of a high-temperature plasma. As the temperature is increased, it is believed that the ionized gas decomposes into atoms and the atoms are then decomposed into electrons and positively charged ions with both electrons and ions moving with high speed corresponding to high temperature. The net negative charge of the electrons cancels the net positive charge of the ions within the plasma. However, introduction of metal halide gas, for example, into the plasma will result in formation of the anion of the metal halide, provided that the metal halide has a positive electron affinity (EA). In this instance, a positive EA corresponds to a chemical entity that accepts an electron and becomes negatively charged. In general, most ligated-metal intermediates can be reduced to an anion by electron transfer. Both FeCl$_2$ and FeCl, for example, have positive electron affinities and will therefore form their respective anions (FeCl$_2^-$, FeCl$^-$) upon acceptance of an electron from the ionized gas.

Examples of suitable gases to be ionized include such relatively stable gases as argon and nitrogen. The more stable the gas, the greater the energy that is required to ionize or remove an electron from the gas. For example, the ionization potentials (IP) of Ar and N$_2$ are 15.76 and 15.58 eV, respectively. Methane is also a suitable ionizing gas (IP=12.51 eV), as is hydrogen (IP=13.60 eV). The use of the latter gas as the source of electrons is particularly advantageous if it is desirous to recover the ligand in the form of its hydrogen halide. For example, vaporization of UF$_6$ and its introduction into a reaction zone of ionized hydrogen atoms affords uranium metal and hydrogen fluoride. Aqueous streams or those containing spurious moisture water also can suffice as the ionizing gas and as a source of hydrogen or oxygen for product formation.

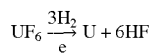

$$UF_6 \xrightarrow[e]{3H_2} U + 6HF$$

In another mode of operation, the ionizing gas can be common to the ligand on the ligated-metal and can be derived by recycling a portion of the recovered gas back into the ionized zone. For example, introduction of FeCl$_3$ into an ionized zone containing Cl$_2$ (IP≈10.48 eV) as the ionizing gas offers the advantage of utilizing a chain reaction. At the temperatures of the ionized zone (>577° K), FeCl$_3$ can thermally dissociate as a primary reaction pathway or else be converted to its radical anion by acquisition of an electron from the plasma. The free energy of thermal dissociation of FeCl$_3$ has a $\Delta G_{2000° K}$=0. However, thermally-induced iron-chlorine bond dissociation of FeCl$_2$ has a free energy of ≈70 kcal/mol at its boiling point (1273° K.) while metal-ligand bond dissociation of FeCl at that temperature is predicted to be in excess of ≈50 kcal/mol. Temperatures in excess of 3,600° K. are required in order to effect thermally induced iron-chlorine bond dissociation ($\Delta G \leq O$). Significantly, metal-ligand bond cleavage in the anions FeCl$_2^-$ and FeCl$^-$ is predicted to have $\Delta G \leq O$ at substantially reduced temperatures.

The significant reduction in free energies of iron-chlorine bond dissociation of these anions is a manifestation of the electronic destabilization of the metal-ligand bond induced by electron transfer from the plasma to the metal-ligand bond yielding a metastable reduced ligated-metal intermediate.

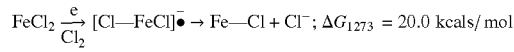

$$FeCl_2 \xrightarrow[Cl_2]{e} [Cl-FeCl]^- \bullet \rightarrow Fe-Cl + Cl^-; \Delta G_{1273} = 20.0 \text{ kcals/mol}$$

The additional electron added to the ligated-metal typically resides in an antibonding orbital and bond rupture takes place in a manner where the negative charge resides on the most electronegative element after bond breaking. The electronegativities of Cl and Fe are about 3.0 and 1.8, respectively.

Electronic destabilization of the Fe—Cl bonds in iron halides by electron transfer to an empty orbital typically results in an order of magnitude reduction in the free energy of bond dissociation at 1273° K. The higher temperatures of the plasma in the ionized zone is even more favorable for metal-ligand bond dissociations as a consequence of positive entropies.

The energy requirements for element recovery from ligated-metals can also be abated by a chain reaction as exemplified by the decomposition of FeCl$_2$ in the presence of the ionized gas Cl$_2$. This is a particularly advantageous embodiment since the ionization potentials of Cl$_2$ and FeCl$_2$ differ by only 1.3 eV. Relatively small differential energy potentials of this magnitude facilitate the overall electron transfer process. Thermal dissociation of Cl$_2$ into two open shell chlorine atoms has an equilibrium constant that approaches unity at about 2100° K. Reactive species, like chlorine atoms, that have an unpaired electron typically exhibit a high affinity to acquire a second electron. Because the electron affinities of Cl and Cl$_2$ are both relatively high and greater than those of FeCl$_2$ and FeCl, the potential for high concentrations of Cl$^-$ and Cl$_2^-$ exists. An initial cleavage of a Fe—Cl bond induced by formation of its radical anion will also produce a chloride anion. Chloride anions generated in this manner can transfer an electron to another neutral FeCl$_2$ molecule to propagate the rupture of electronically destabilized Fe—Cl bonds.

$$FeCl_2 + [Cl-FeCl]^- \rightarrow FeCl + Cl^- \qquad \text{(eq. 1)}$$

$$Cl^- + FeCl_2 \rightarrow Cl \cdot + [Cl-FeCl]^- \qquad \text{(eq. 2)}$$

Subsequent decomposition of additional FeCl$_2$ molecules may occur by extending the length of this kinetic chain. This is energetically highly favorable since the energy expended for producing the electron that initiated the first decomposition (eq. 1) suffices to induce decomposition of a second molecule by transfer of an electron from a primary chain carrier such as Cl$^-$ or Cl$_2^-$ to an unoccupied molecular orbital on the ligated-metal (eq. 2). The source of electrons that increase the electron population of the empty orbital of the ligated metal can also be generated by an oxidation reduction potential of dissimilar materials.

More generally, although the claimed invention is not to be limited to any particular theory, it is believed that ions and/or electrons in the ionized zone electronically destabilize a thermodynamically stable metal-ligand bond of the ligated-metal. For example, in the case of iron trichloride, the ionized zone can cause transfer of an electron to the ligated-metal, thereby electronically destabilizing the compound and causing dissociation of the reduced ligated-metal intermediate and inducing subsequent metal-ligand bond rupture, said ligated-metal being converted by the metal-ligand bond rupture into chemical components of the ligated-metal. Further, it is possible that chain reactions of successive metal reduction can occur by this method, whereby, for example, iron trichloride ($FeCl_3$) is converted to iron dichloride ($FeCl_2$). Iron dichloride is converted to iron monochloride (FeCl). The iron in iron chloride is then reduced to elemental iron (Fe), which accumulates as a molten precipitate in reactor 10. Chlorine atoms that are dissociated from the ligated-metal and, ultimately, from the elemental metal, can contribute to dissociation of other ligated-metal molecules. In addition, dissociated chlorine can recombine to form chlorine gas ($Cl_2$) that is subsequently ionized by ionizing means or discharged from reactor 10.

Electronic destabilization of the metal-ligand bond can produce a primary chain carrier that induces a chain reaction. The primary chain carrier can be a charged species that is generated in situ, such as in the ionized zone. Examples of primary chain carriers are charged metals, charged halides, charged metal halides, charged salts, etc. Further, the primary chain carrier can be metastable. The chain reaction induced by the primary chain carrier can have a kinetic chain length greater than about 10.

In another embodiment, electronic destabilization of the metal-ligand bond can produce a primary chain carrier that induces a chain reaction which, in turn, induces a free radical chain reaction that employs a primary radical chain carrier. The primary chain carrier can be an open-shell species generated in situ, such as in the ionized zone. Examples of primary radical chain carriers include metals, halides, salts, etc. In addition, the primary radical chain carrier can be metastable. The primary radical chain carrier can be employed in radical chain reactions that have a chain length greater than about ten, or greater than about fifty.

In still another embodiment, hydrogen gas can be ionized and, where iron trichloride is the ligated-metal, dissociated chlorine ions can combine with hydrogen ions to form hydrochloric acid that is discharged from reactor 10 as a gas. Again, although not to be limited to any particular theory, it is believed that a ligated-metal can be converted in the ionized zone to intermediates that are cations or anions, depending upon the composition of the gas in the ionized zone and on the ligated-metal compound directed into the ionized zone. For example, iron trichloride ($FeCl_3$) can be converted to $FeCl_2+$ and chlorine gas ($Cl_2$) in the presence of an ionized gas comprising chlorine gas ($Cl_2$).

Optionally, a component of the ionized zone can be condensed at condenser 42 within reactor 10. Condenser 42 can be maintained at a suitable temperature by, for example, conducting a suitable heat transfer medium through condenser 42. Examples of components that can be condensed include elemental metal, intermediates formed during reduction of a metal component of a ligated-metal, etc. Condensation of the metal from its gaseous to liquid state offers the advantage of liberation of its heat of vaporization. An example of a component that can be condensed during reduction of the iron component of the iron trichloride is iron. Alternatively, an example of a component that can be condensed during reduction of the iron component of the iron trichloride is iron dichloride. The iron dichloride can be condensed at condenser 42 by maintaining a temperature at condenser 42 of about 1,200° C., thereby conducting the component recovery in a stepwise fashion. In addition to cooling the condenser, the elemental component may be collected and recovered in this reaction zone by placing an electrical charge on the collection surface to facilitate condensation of the metal and effect repulsion of the ligand.

Elemental metal that accumulates in reactor 10 can be discharged from reactor 10 through outlets 20,22. Optionally, other precipitates can accumulate in reactor 10. In one embodiment, other precipitates can accumulate as a distinct layer on top of a lower molten metal layer. These other precipitates can be components of a ceramic layer and can be discharged from reactor 10 through ceramic outlet 24.

Ceramic outlet 24 is connected by conduit 44 to cooler/storage hopper system 46. Cooler/storage hopper system 46 includes gas purge source 48 for removal of residual gas from ceramic material discharged from reactor 10. Cooling source 50 is suitable for transferring a cooling medium through cooler/storage hopper system 46 to thereby cool ceramic material collected within cooler/storage hopper system 46. Ceramic materials within cooler/storage hopper system 46 can be discharged through outlet 52 for subsequent packaging or reprocessing. Gas can be discharged from cooler/storage hopper system 46 at outlet 53.

At least a portion of the gas generated in the ionization zone is discharged through gas outlet 26 and conduit 54 to gas cooler 56. Gas discharged from reactor 10 can be cooled at gas cooler 56 to a suitable temperature for subsequent filtration. An example of the suitable temperature is a temperature of about 200° C. Cooled gas is discharged from gas cooler 56 through conduit 58 to first filter 60. First filter 60 can be, for example, a sintered metal or ceramic filtration system. Particulates collected at first filter 60 can be blown back into reactor 10 by gas directed into first filter 60 from gas source 62 through conduit 64. Conduit 66 extends from first filter 60 to second filter 68, which can also be a sintered metal or ceramic filtration system. Particulates collected at second filter 68 can be discharged from second filter 68 and collected at collection system 70. Examples of particulates that can be separated from the gas stream discharged from reactor 10 include metal oxides and waste components directed into reactor 10 with the ligated-metal and that are entrained by the gas stream discharged from reactor 10.

The gas stream is then discharged from second filter 68 through filtered gas outlet 72 and conduit 74 to condenser 76. Condenser 76 is suitable for condensing at least a portion of gas components in the gas stream. An example of a gas component that is condensed by condenser 76 is a hydrogen halide, such as hydrogen fluoride (HF) or hydrogen chloride (HCl). Condenser 76 includes outlet 78 for removing condensed gas components from condenser 76. The gas stream is then discharged from condenser 76 through gas outlet 80 and is conducted through conduit 82 to chemical trap 84. Chemical trap 84 can include a reactive metal oxide, such as aluminum oxide ($Al_2O_3$) or calcium carbonate ($CaCO_3$), for trapping residual hydrogen halides from the gaseous stream. Alternatively, a water scrubber can be employed for removing hydrogen halides. In this embodiment, spent aqueous scrubber liquid can be volatilized to steam and recycled to reactor 10 as feed. Hydrogen halides collected from the gas stream can be stored in standard iron storage cylinders or high-density polyethylene containers. Gas discharged from condenser 76 and chemical trap 84 can be directed through conduit 85 and suitable filters 86,88 for further filtering of residual particulates, and then suitably treated for subsequent discharge to the atmosphere through conduit 90. Optionally, at least a portion of the gas stream can be recycled back to the ionization zone within reactor 10, such as by directing at least a portion of the gas stream through conduit 92 to ionization gas source 34 and/or ligated-metal source 38.

As a consequence of the method of the invention, components of molten bath 32 or the gas can be collected as chemical components that have been dissociated from the ligated-metal. The chemical components can be hetero compounds or elemental compounds, or can be in elemental form, such as an elemental metal, and can be collected separately from reactor 10 as recovered raw materials for subsequent commercial use.

Equivalents

Those skilled in the art will recognize, or be able ascertain using no more than routine experimentation, many equivalents of the invention described specifically herein. Such equivalents are intended to be encompassed in the scope of the following claims.

We claim:

1. A method for converting a ligated-metal of a ligated-metal feed into chemical components of the ligated-metal, comprising the steps of:
   a) forming an ionized zone by exposing a gas to an ionizing agent, wherein the ionizing agent is in a form selected from a group consisting of and a magnetic field, and wherein the ionized zone can convert said ligated-metal to a reduced ligated-metal intermediate; and
   b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal.

2. The method of claim 1 wherein the ionizing agent is in the form of heat.

3. The method of claim 1 wherein the ionizing agent is in the form of a magnetic field.

4. A method for converting a ligated-metal of a ligated-metal feed into chemical components of the ligated-metal, comprising the steps of:
   a) forming an ionized zone by forming a source of electrons by combining dissimilar metals, wherein the ionized zone can convert said ligated-metal to a reduced ligated-metal intermediate; and
   b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal.

5. A method for converting a ligated-metal of a ligated-metal feed into chemical components of the ligated-metal, comprising the steps of:
   a) forming an ionized zone that can convert said ligated-metal to a reduced ligated-metal intermediate; and
   b) directing the ligated-metal feed into the ionized zone, whereby said ligated-metal is converted to a reduced ligated-metal intermediate, thereby causing a thermodynamically stable metal-ligand bond of said ligated-metal to be electronically destabilized producing a primary chain carrier that induces a chain reaction and inducing subsequent metal-ligand bond rupture, said reduced ligated-metal intermediate being converted by the metal-ligand bond rupture into chemical components of said ligated-metal.

6. A method of claim 5 where the chain reaction induced has a kinetic chain length greater than about 10.

7. A method of claim 5 where the primary chain carrier is a charged species generated in situ.

8. A method of claim 5 where the primary chain carrier is a charged metal.

9. A method of claim 5 where the primary chain carrier is a charged halide.

10. A method of claim 5 where the primary chain carrier is a charged metal halide.

11. A method of claim 5 where the primary chain carrier is a charged salt.

12. A method of claim 5 where the primary chain carrier is metastable.

13. A method of claim 5 wherein the chain reaction in turn induces a free radical chain reaction that employs a primary radical chain carrier.

14. A method of claim 13 where the radical chain reaction induced has a kinetic chain length greater than about 10.

15. A method of claim 13 where the radical chain reaction induced has a kinetic chain length greater than about 50.

16. A method of claim 13 where the primary chain carrier is an open shell species generated in situ.

17. A method of claim 13 where the primary radical chain carrier is a metal.

18. A method of claim 13 where the primary radical chain carrier is a halide.

19. A method of claim 13 where the primary radical chain carrier is a salt.

20. A method of claim 13 where the primary radical chain carrier is metastable.

21. A method for converting a ligated-metal of a ligated-metal feed into chemical components of the ligated-metal, comprising the steps of:
   a) forming an ionized zone that can convert said ligated-metal to a reduced ligated-metal intermediate;
   b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal: and
   c) separating at least one of the chemical components from the ionization zone, wherein the separated chemical component is a radioactive element in its elemental state.

22. The method of claim 21 wherein the radioactive element includes an actinide.

23. The method of claim 22 wherein the radioactive element includes uranium.

24. A method for converting a ligated-metal of a ligated-metal feed into chemical components of the ligated-metal, comprising the steps of:
   a) forming an ionized zone that can convert said ligated-metal to a reduced ligated-metal intermediate;

b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal; and c) separating at least one of the chemical components from the ionization zone, wherein the separated chemical component is a transition metal in its elemental state.

25. The method of claim 24 wherein the metal includes iron.

26. The method of claim 24 wherein the metal includes nickel.

27. A method for converting a ligated-metal of a ligated-metal feed into chemical components of the ligated-metal, comprising the steps of:

a) forming an ionized zone by ionizing a gas, wherein the gas that is ionized includes an elemental component that is common to the ligated-metal feed, and wherein the ionized zone can convert said ligated-metal to a reduced ligated-metal intermediate; and b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal.

28. The method of claim 27 further including the step of separating the gas from the ionized zone.

29. The method of claim 28 further including the step of returning a portion of the separated gas to the ionized zone.

30. A method for converting a ligated-metal of a ligated-metal feed into chemical components of the ligated-metal, comprising the steps of:

a) forming an ionized zone by ionizing the ligated-metal feed, wherein the ionized ligated-metal feed includes a cation, and wherein the ionized zone can convert said ligated-metal to a reduced ligated-metal intermediate, and b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal.

31. A method for converting a ligated-metal of a ligated-metal feed into chemical components of the ligated-metal, comprising the steps of:

a) forming an ionized zone by ionizing the ligated-metal feed, wherein the ionized ligated-metal feed includes an anion, and wherein the ionized zone can convert said ligated-metal to a reduced ligated-metal intermediate; and directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being coverted by the metal-ligand bond rupture into chemical components of said ligated-metal.

32. A method for converting a ligated-metal of a ligated-metal feed into chemical components of the ligated-metal, comprising the steps of:

a) forming an ionized zone by ionizing a gas to form an ionized gas component that can dissociate the chemical component from the ligated-metal feed, wherein the ionized zone can convert said ligated-metal to a reduced ligated-metal intermediate, and wherein the ionization potential of the ionizing gas and ligated-metal feed are about equal; and b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal.

33. The method of claim 32 wherein the difference between the ionization potential of the ionizing gas and the ionization potential of the ligated-metal feed is less than about two electron volts.

34. A method for converting a ligated-metal of a ligated-metal feed into chemical components of the ligated-metal, comprising the steps of:

a) forming an ionized zone by ionizing a halogen gas to form an ionized gas component that can dissociate the chemical component from the ligated-metal feed, wherein the ionized zone can convert said ligated-metal to a reduced liaated-metal intermediate; and b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal.

35. The method of claim 34 wherein the halogen gas includes chlorine gas.

36. The method of claim 34 wherein the halogen gas includes fluorine gas.

37. A method for converting a ligated-metal of a ligated-metal feed into chemical components of the ligated-metal, comprising the steps of:

a) forming an ionized zone that can convert said ligated-metal to a reduced ligated-metal intermediate; and b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal, wherein the ligated-metal feed includes a composition selected from the group consisting of an actinide metal halide, a metal oxide, a metal sulfide, iron chloride, nickel chloride, iron oxide, and copper sulfide.

38. The method of claim 37 wherein the ligated-metal feed includes an actinide metal halide.

39. The method of claim 38 wherein the ligated-metal feed includes uranium.

40. The method of claim 37 wherein the ligated-metal feed includes a metal oxide.

41. The method of claim 37 wherein the ligated-metal feed includes a metal sulfide.

42. The method of claim 37 wherein the ligated-metal feed includes an iron chloride.

43. The method of claim 37 wherein the ligated-metal feed includes nickel chloride.

44. The method of claim 37 wherein the ligated-metal feed includes iron oxide.

45. The method of claim 37 wherein the ligated-metal feed includes copper sulfide.

46. A method for converting a ligated-metal of a ligated-metal feed into chemical components of the ligated-metal, comprising the steps of:
   a) forming an ionized zone that can convert said ligated-metal to a reduced ligated-metal intermediate; and
   b) directing the ligated-metal feed into the ionized zone, whereby said ligated-metal is converted to a reduced ligated-metal intermediate, thereby causing a thermodynamically stable metal-ligand bond of said ligated-metal to be electronically destabilized and inducing subsequent metal-ligand bond rupture, said reduced ligated-metal intermediate being converted by the metal-ligand bond rupture into chemical components of said ligated-metal, wherein the ligated-metal feed includes a ligand component including a composition selected from the group consisting of an oxyhalide, a nitride, an oxide, a sulfide, —CN. —OCN.—SCN. —SeCN. and —$N_3$.

47. The method of claim 46 wherein a ligand component of the ligated-metal feed includes an oxyhalide.

48. A method of claim 46 wherein a ligand component of the ligated-metal feed includes a nitrate.

49. A method of claim 46 wherein a ligand component of the ligated-metal feed includes an oxide.

50. A method of claim 46 wherein a ligand component of the ligated-metal feed includes a sulfide.

51. A method of claim 46 wherein a ligand component of the ligated-metal feed includes a component selected from the group consisting of —CN, —OCN, —SCN, —SeCN, and —$N_3$.

52. A method for recovering an elemental metal from a ligated-metal waste, comprising the steps of:
   a) ionizing a gas within a reactor to form an ionized gas component that can reduce a metal of the ligated-metal waste to form an elemental metal precipitate; and
   b) directing the ligated-metal waste into the reactor, whereby the ionized gas component reduces the metal of said ligated-metal waste to form the elemental metal precipitate, thereby recovering the elemental metal from the ligated-metal waste, wherein the ligated metal waste includes iron chloride.

53. A method for recovering an elemental metal from a ligated-metal waste, comprising the steps of:
   a) ionizing chlorine gas within a reactor to form an ionized gas component that can reduce a metal of the ligated-metal waste to form an elemental metal precipitate; and
   b) directing the ligated-metal waste into the reactor, whereby the ionized gas component reduces the metal of said ligated-metal waste to form the elemental metal precipitate, thereby recovering the elemental metal from the ligated-metal waste.

54. The method of claim 52 wherein chlorine gas is discharged from the reactor and a portion of the discharged chlorine gas in recycled back to the reactor for subsequent ionization.

* * * * *

UNITED STATES PATENT AND TRADEMARK OFFICE
CERTIFICATE OF CORRECTION

PATENT NO. : 6,096,109
DATED : August 1, 2000
INVENTOR(S) : Christopher J. Nagel and Robert D. Bach It is certified that error appears in the above-identified patent and that said Letters Patent is hereby corrected as shown below:

At Claim 1, line 29, delete "consisting of and" and insert --consisting of heat and--.

At Claim 34, line 37, delete "reduced liaated-metal" and insert --reduced ligated-metal".

At Claim 46, line 36, delete "–CN. –OCN.–SCN. –SeCN." and insert ---CN, –OCN, –SCN, –SeCN,--.

Signed and Sealed this

Seventeenth Day of April, 2001

*Attest:*

NICHOLAS P. GODICI

*Attesting Officer*      *Acting Director of the United States Patent and Trademark Office*